April 4, 1950     E. C. BURDICK     2,502,776
PRESSURE GAUGE

Filed Aug. 12, 1944     2 Sheets-Sheet 1

INVENTOR.
EDWIN CLARK BURDICK

BY
C. B. Spangenberg
ATTORNEY.

April 4, 1950  E. C. BURDICK  2,502,776
PRESSURE GAUGE
Filed Aug. 12, 1944  2 Sheets-Sheet 2
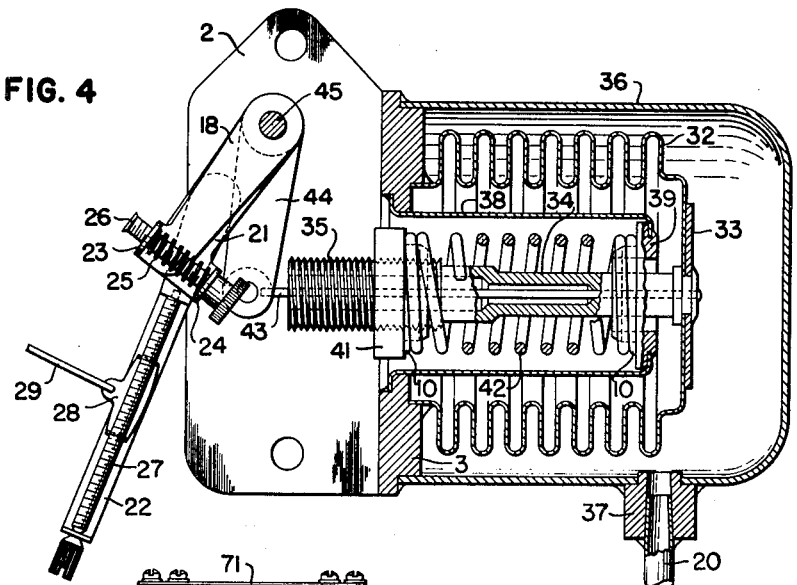
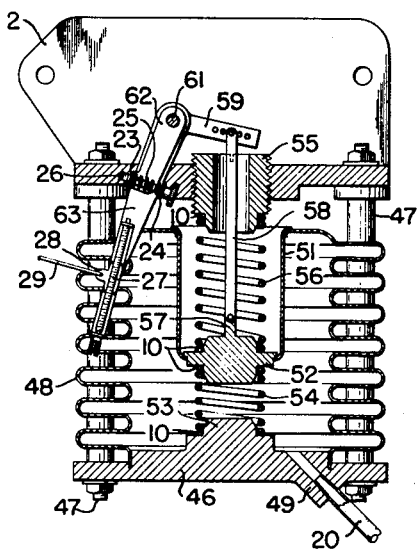
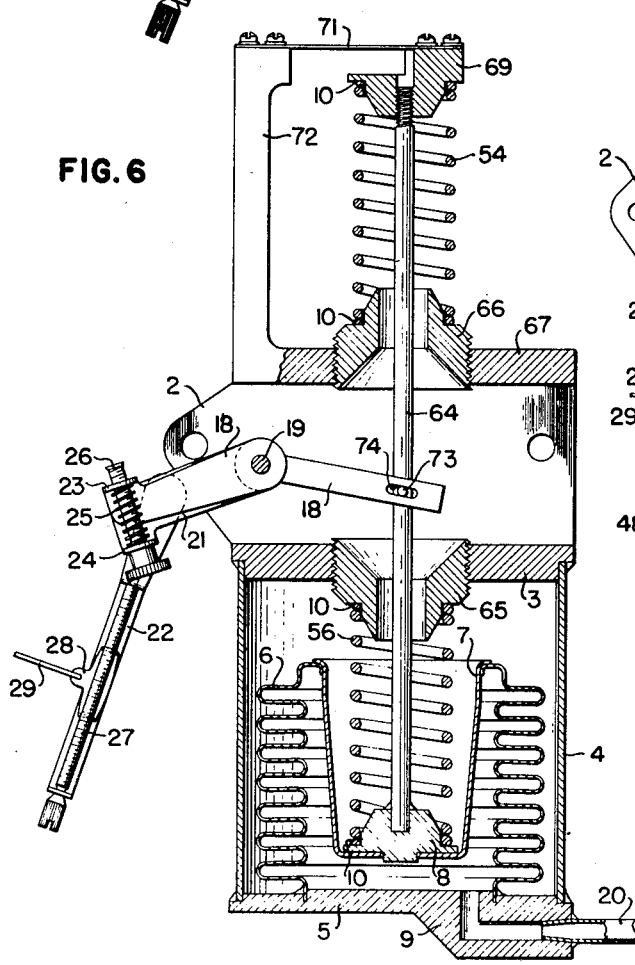
INVENTOR.
EDWIN CLARK BURDICK.
BY
*C. B. Spangenberg*
ATTORNEY.

Patented Apr. 4, 1950

2,502,776

UNITED STATES PATENT OFFICE 2,502,776

PRESSURE GAUGE

Edwin C. Burdick, Philadelphia, Pa., assignor, by mesne assignments, to Minneapolis-Honeywell Regulator Company, Minneapolis, Minn., a corporation of Delaware Application August 12, 1944, Serial No. 549,257

13 Claims. (Cl. 73—410)

1

The present invention relates to pressure gauges, and more particularly to low range bellows and spring type pressure gauges that are designed for various ranges. One such range is from zero to five inches of water. Another such range is from zero to 15 pounds per square inch.

In pressure gauges of the bellows and spring type the pressure to be measured is applied to a chamber, one wall of which is formed of a bellows that is collapsed or expanded as the pressure varies. The movement of the bellows is opposed by a calibrated spring so that as the bellows changes in length the spring also changes in length. Therefore, the position of the end wall of the bellows is a measure of the pressure. Through suitable means an exhibiting element is moved by the bellows end wall.

In the higher pressure ranges the strength of the calibrating spring that is used is so much greater than the spring force of the bellows that for calibrating purposes, the bellows strength can generally be disregarded. In the lower pressure ranges, however, the force exerted by the bellows due to their natural resiliency is so near that of the calibrating spring that this force definitely enters into the design of the instrument.

It is an object of the invention to make a pressure gauge of the bellows and spring type with a high degree of accuracy. This is accomplished by designing the instrument so that the bellows is under compression throughout the entire operating range. The bellows is always expanded as the pressure or vacuum, depending upon the design of the gauge, is increased. The amount of expansion is so selected that it takes place along a straight portion of the bellows pressure-length curve. Thus the linear characteristic of the bellows combined with a spring having a linear characteristic through its range of movement will produce an instrument that can easily be calibrated throughout its range. The range of the instrument is determined by the gradient of the spring being used.

It is a further object of the invention to provide a pressure gauge of the bellows and spring type in which the bellows is initially compressed a maximum amount and is expanded as the pressure being measured is increased, or is expanded as the vacuum being measured is increased. In compound range instruments or instruments in which the range is from below atmospheric pressure to above atmospheric pressure, the bellows is expanded as the pressure increases.

It is a further object of the invention to provide a bellows and spring type pressure gauge in which the expansion of the bellows takes place only through the portion of its range of expansion in which its pressure-length curve is linear. Thus a low range pressure gauge may be made which has linear characteristics.

It is a further object of the invention to make a bellows and spring type of pressure gauge in which the natural resiliency of the bellows is used to oppose the force of the spring. The initial force of the bellows, therefore, acts to completely close the end turns of the spring and causes the spring to seat properly on its support. This is a particularly important feature in pressure gauges that are designed to operate through the low ranges for which the gauges of the present invention are designed. Ordinarily the force exerted by the pressure being measured that is necessary to close the end turns and seat the spring properly is such a small proportion of the total pressure range that its effect on a record made by the pressure gauge and the calibration thereof is negligible. With low pressure gauges, however, the percentage of the total pressure range needed to close the end turns of the spring is appreciable. It is for this reason that the low pressure gauges of the prior art have been of the inverted bell or diaphragm type.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Figure 4 is another embodiment of the invention primarily designed for measuring sub-atmospheric pressures.

Figure 5 is another embodiment of the invention designed for compound ranges of pressures.

Figure 6 is another embodiment of the invention for compound pressure ranges.

Figure 1:
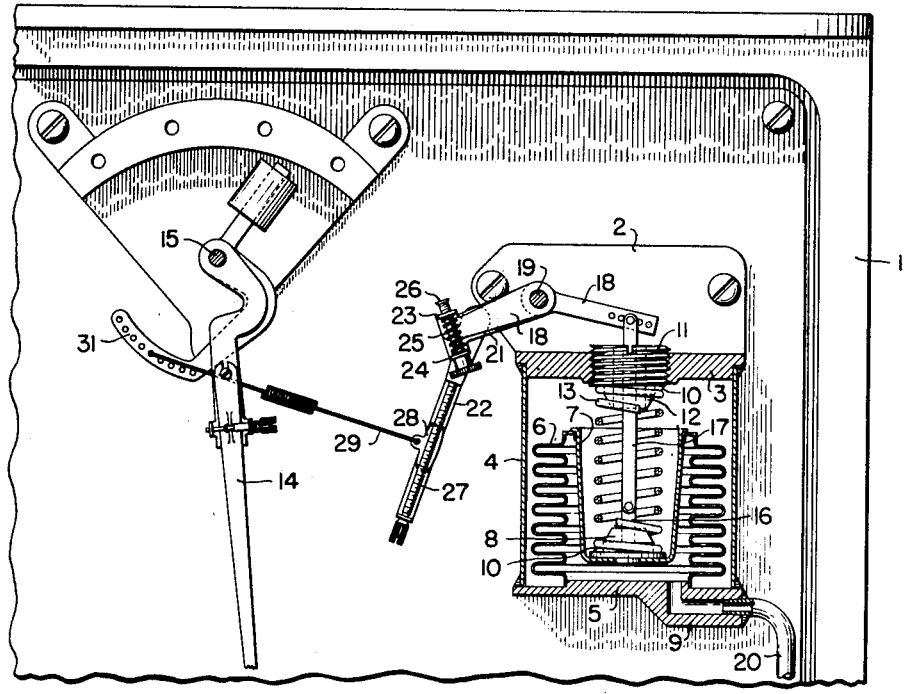
Figure 1 is a view of the one embodiment of the invention.

Referring to Figure 1 there is shown one embodiment of the invention for measuring low ranges of pressure. As is shown therein the pressure responsive unit is mounted in an instrument case 1 by means of a support 2 which forms part of the responsive unit. This supporting member is formed with a downwardly extending circular projection 3 to which is attached a cylindrical member 4 and attached to the lower end thereof, is a bellows assembly. This assembly consists of a base member 5 to which is permanently attached the lower end of bellows 6. The free end of the bellows is closed by a cup-shaped member 7 which, in effect, forms the end wall thereof. This member projects downwardly into the bellows in order that the unit may be made shorter and more stable than would be the case if it were a flat disc. Fastened to the end of the member 7 is a spring seat 8. The base 5 is provided with a fitting 9 that has an opening in it through which the pressure to be measured is communicated to the interior of the bellows. The other end of the fitting 9 is attached to a piece of tubing 20 which extends to the region whose pressure is to be measured.

The projection 3 has a threaded opening in it in which a threaded member 11 is adjustably placed. The member 11 has projecting downwardly from it a second spring seat 12 that is coaxial with the spring seat 8. A calibrated spring 13 is received on these two seats and tends to compress initially the bellows with a force that is dependent upon the adjustment of seat 12. The spring 13 is wound with its turns equally spaced, except at the ends where they are closed and the spring ground to present a flat end surface. This means that the last turn of the spring tapers off, as shown in the drawing at 10, from the full diameter of the wire of which it is wound to zero. It is extremely difficult to keep this end in engagement with the turn next adjacent it. It will be obvious that as the spring is compressed the end turns will move under an initial small force that would not be sufficient to compress the rest of the spring.

As the pressure applied to the interior of the bellows varies, the bellows end wall is moved and serves to move an exhibiting member 14 that is pivoted at 15 in the instrument casing. This means for moving this exhibiting member in response to the change in the bellows length, consists of a projection 16 that is attached to the spring seat 8. This projection has fastened to it the lower end of a link 17, the upper end of which is fastened to one arm of a bell-crank lever 18 that is pivoted at 19 on the support 2. Also pivoted to the shaft 19 is an arm 21 which has an angular extension 22 attached to it. The arm 21 is adjustably fastened to the arm 18 for movement therewith in the following member. The arm 18 is formed with an upstanding ear 23 and the arm 21 is similarly formed with an upstanding ear 24. Between these two ears there is placed a spring 25 and adjusting screw 26 that is attached to the ear 24 and threadedly received in the ear 23. Therefore, the spring 25 tends to separate the arms 18 and 21 an amount determined by the adjustment of the screw 26. The extension 22 is provided with bearings to receive an adjusting screw 27 whose adjustment determines the position of a slider 28 along it. The slider is connected by a link 29 with an arm 31 that is also attached to the pivot shaft 15 for the exhibiting element 14. Therefore as the bellows changes in length, the linkage described produces a movement of exhibiting element 14. As is shown herein an increase in pressure applied to the interior of the bellows 6 will cause a counterclockwise movement of the exhibiting arm 14. It is noted that this arm may either be a pointer which moves across a scale or it may be a pen arm which moves a pen across a suitably calibrated chart.

The adjustments made by the screw 26 and the screw 27 are factory adjustments which are known respectively as "zero" and "range" adjustments. To compensate for small variations in the initial length of the bellows 6, the arm 21 is shifted with respect to the arm 18 by means of the screw 26. This adjustment shifts the initial position of the exhibiting element 14 along its scale or chart so that this element will be properly positioned over the zero of the chart when the pressure in the bellows is atmospheric. The adjustment screw 27 is used to shift the slider 28 closer to or further from the pivot 19 and therefore vary the amount of movement of the exhibiting element 14 for a given change in length of the bellows 6. This adjustment compensates for the variations in tension of the bellows and the spring. It is noted that these adjustments when once made should not be disturbed.

Figure 2:
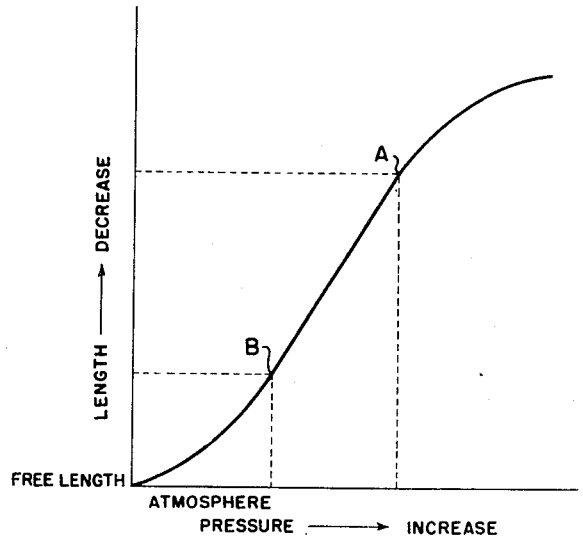
Figure 2 is a characteristic curve of pressure plotted against length for an average bellows.
Figure 3:
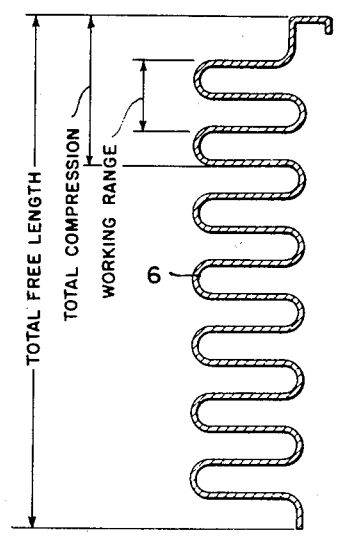
Figure 3 is a diagram showing the manner in which the bellows is compressed.

Referring to Figure 2, there is shown a curve which is approximately S-shaped. It will be seen that as the pressure is increased from atmospheric along the abscissa, the bellows will be decreased from its free length to some length depending upon the pressure. Initially the compression is small for a given increase in pressure. The slope of the curve, however, increases during the middle portion of its length and decreases again as the bellows is completely compressed. While the change of the slope of the curve is relatively small, this change is enough to definitely distort the calibration curve when the bellows is used as a low pressure gauge. It is therefore an object of this invention to use only the straight middle portion of the pressure-length curve of the bellows for the range through which it operates. Initially, therefore, the bellows is compressed to point A on the curve and as the pressure being measured increases the bellows is expanded to point B. This is accomplished by using a spring which will place the bellows under an initial compression, and compressing this spring by the pressure being measured until the bellows has expanded sufficiently to move it to point B on the curve. Another advantage obtained by this construction is that the force initially exerted by the bellows is sufficient to require that the spring be placed under a positive compression. This means that the end turns of the spring will be positively forced together and that the spring will be properly seated. As is shown in Figure 3 of the drawing, a bellows has some given initial free length. The bellows may be compressed some total amount as indicated in that figure, but for purposes of this invention, the bellows is only used through a narrow working range which never permits the bellows to regain its free length and which never compresses the bellows entirely. In this fashion it is insured that the bellows will always work through the linear portion of its characteristic curve, or between points A and B, so that the force of the bellows may be utilized in the calibration of the instrument.

The gauge disclosed in Figure 1 is used for measuring pressures above atmospheric. The gauge disclosed in Figure 4, however, is designed for measuring pressures below atmospheric. This gauge has the same characteristic as that of Figure 1 since the bellows are designed to be initially under compression and they are extended as the vacuum being measured increases. As is shown in this figure, the support 2 is placed on its side instead of in the position shown in Figure 1. The reason for this is so that the indicating arm will be moved to the right as the vacuum increases.

In this embodiment of the invention a bellows 32 is attached directly to the support 2. As shown herein, the support is provided with a shoulder to which the open end of the bellows is attached by any suitable means such as being soldered thereto. The base of the bellows is reinforced by means of a plate 33. This plate helps the base of the bellows to support rigidly a tubular member 34 that extends to the left from this base and which is formed on its left end with threads 35. Surrounding the bellows and also attached to the support 2 is a cup-shaped casing 36 which serves to form with the bellows a chamber that is subjected to the vacuum being measured. This chamber is placed in communication with the vacuum by means of the tube 20 that is supported by a fitting 37 fastened to the outside of the cup-shaped member 36.

In this case the support 2 is provided with a comparatively large opening in which is fastened a cylindrical member 38 that has a spring seat 39 fastened in its lower end. A second spring seat 41 is threaded on the portion 35 of the tubular member 34. A suitable calibrated spring 42 is received between these spring seats, the seat 41 being adjusted until the spring is placed under enough initial tension to compress the bellows to the point A on the curve of Figure 2, close its end turns and be properly seated.

The exhibiting element in this case is moved by the bellows end wall by means of a flexible link or wire 43 that is fastened at one end inside of the tubular member 34 and at its other end to one arm of a bell-crank lever 44 that is pivoted at 45 on the support 2. This lever 44 serves the same purpose as the lever 18 of Figure 1 and is connected to the exhibiting element of the instrument in the same fashion.

In the operation of this embodiment of the invention, a vacuum is pulled through the tube 20 to expand the bellows 32 and to move the exhibiting element to the right. It will be noticed that as the vacuum is increased, the bellows will be expanded from point A to point B on the bellows pressure-length curve. Thus the natural resiliency of the bellows opposes the spring and at atmospheric pressure the force of the bellows opposing this spring is at its maximum. In this case, also, the bellows will be working through that portion of the characteristic curve which is linear so that when used with a spring having a linear characteristic for the range to which it is subjected, the characteristic of the instrument will be substantially linear.

The embodiment of the invention disclosed in Figure 5 is designed to be used for compound ranges of pressure, i. e., for pressure ranges that extend from below to above atmospheric. In this embodiment instead of having the bellows enclosed in a housing such as 4 that was used in Figure 1, the bellows is located in an open cage formed of a base 46 that is held in a fixed position relative to the support 2 by means of bolts 47. The bellows is mounted at its lower end to the base 46 while the upper end thereof is free to expand and contract as was the bellows in Figure 1. This bellows is also provided with a cup-shaped member 51 that projects into the interior thereof, which cup-shaped member has its lower end closed by means of a double spring seat 52. Located within the bellows is a second spring seat 53 which along with the lower portion of the seat 52 serves to hold a spring 54 in place. Threaded into an opening in the support 2 is another spring seat 55 which along with the upper portion of seat 52 serves to locate a second spring 56. These springs are designed in a manner to be discussed below to hold the bellows under an initial compression which is sufficient to compress it to point A on the bellows characteristic curve.

Movement of the bellows end wall or the spring seat 52 is imparted to the exhibiting element by a linkage similar to that which has previously been described. In this case the spring seat is provided with a projection 57 to which one end of a link 58 is connected. The other end of this link is pivoted to an arm 59 that is attached to a pivot shaft 61. Also fastened to the shaft 61 is an arm 62 that corresponds to the left hand arm of the bell-crank lever 18 in Figure 1. Loosely mounted on the shaft 61 is another arm 63 that extends downwardly therefrom and which is adjustably connected to the arm 62 by a zero adjusting connection similar to that which has previously been described. The arm 63 is connected by a range adjustment in a fashion previously described with the exhibiting element 14.

In an instrument of this type the springs 54 and 56 are designed to have a gradient depending upon the range of the instrument. In any case, however, the springs are of such a length that they are always under compression no matter what the length of the bellows may be throughout its range of movement. When the interior of the bellows is subjected to the maximum vacuum for which the instrument is designed, or the lowest pressure, the bellows end wall will be at the point A on the bellows characteristic curve. As the pressure is increased the bellows will gradually elongate until it has reached the point B on the curve. Some place during this increase in pressure, the pressure on the interior of the bellows will be atmospheric. At this point the force of the spring 56 should be equal to the force of the spring 54 plus the force of the natural resiliency of the bellows at that point in the range of the instrument. This is true since the pressure on the interior and on the exterior of the bellows is equal. The range of the instrument is dependent upon the gradient of the two springs. It will be seen that in this case also the bellows is shortest when the minimum pressure is applied to its interior and it increases in length as the pressure increases.

The pressure gauge shown in Figure 5 is a compact instrument since the springs are housed within the dimensions of the bellows itself. In some cases, however, the atmosphere to which the interior of the bellows is subjected has a corrosive effect upon the springs. The bellows can be made of almost any material, but it is necessary to make the springs of steel in order to get the desired characteristics and gradient thereof. In some cases it is necessary to use a compound range instrument in atmospheres which are harmful to the springs. When an instrument is put to such a use, the construction shown in Figure 6 is used. This instrument has the same range and is designed in exactly the same manner as the instrument shown in Figure 5 except that the parts are so arranged that the bellows does not have a spring located in it. The spring 54 has been moved outside of the bellows so that it will be in a normal atmosphere.

Referring to Figure 6 it will be seen that the bellows itself and the housing therefore is similar to that disclosed above in connection with Figure 1 and similar parts have been given similar reference numerals. In this case, however, the bellows movement is imparted to a rod 64 that extends substantially above the support 2. This rod extends through a spring seat 65 located in the projection 3, and through a second spring seat 66 that is adjustably mounted in an extension 67 of the support 2. The second spring 54 is in this case mounted between the spring seat 66 and a fourth spring seat 69 that is attached to the upper end of the rod 64. The rod is guided at its upper end by means of a strip 71 that is attached to a projection 72 extending upwardly from the frame 2. This strip is preferably made of some material such as a spring steel band, but it is not strong enough to have any effect on the calibration of the instrument. Motion of rod 64 is transferred to the exhibiting element by means of a pin 73 projecting from the rod 64 which pin is received in a slot 74 formed in the right arm of the bell crank lever 18. It will be seen that in this case the spring 54 tends to elongate the bellows as did the spring 54 in Figure 5. This spring, along with the bellows, opposes the force of spring 56. It is noted that the initial force of both springs 54 and 56 may be varied by adjusting the spring seats 66 and 65, respectively. The operation of this pressure gauge is exactly the same as that shown in Figure 5 and the springs shown are selected with the same functions in mind.

From the above description it will be seen that I have made a pressure gauge in which a bellows and spring are used as the responsive elements. The elements are so designed and mounted relative to each other that the bellows is moved only through the linear portion of its characteristic curve and the natural resiliency of the bellows is always opposed by the calibrated spring. The construction is also such that the end turns of the calibrated spring are kept closed throughout the range of the instrument, and the spring is always properly seated on its supports.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is:

1. In a pressure gauge, the combination comprising means forming a chamber, said means including a bellows forming one wall of said chamber, said bellows having a normal given free length, a calibrating spring, means to mount said spring on the exterior of said chamber between a fixed point and a point movable with an end wall of said bellows as the latter changes in length, said spring operating to compress said bellows to a second given length, said second given length being such that the bellows will not expand to its free length upon the application thereto of the maximum expanding pressure for which the instrument is designed whereby said bellows is always under compression, an exhibiting element and means to move said exhibiting element from said bellows end wall.

2. In a pressure gauge, the combination of means forming a chamber to which the pressure to be measured is applied, one wall of said chamber being formed of a bellows, the bellows being so arranged that it is elongated as the pressure to be measured varies from the low to the high portion of its range, a calibrating spring having one end fixed outside of said chamber and the other end acting against an end wall of said bellows to compress the same to such an extent that such bellows does not expand to its free length at any pressure within the range which the gauge measures, the natural resiliency of the bellows opposing the force of the spring, the initial compression of the bellows being such that its expansion throughout the range of the gauge will be linear for unit changes in pressure, and exhibiting means operated by said bellows as it changes in length.

3. In a pressure gauge, the combination of a chamber including a bellows to which the presure to be measured is applied, a spring having one end fixed outside of said chamber and its other end engaging a movable portion of said bellows, said bellows being placed under an initial compression by said spring so that the bellows will be expanded as the pressure to be measured varies from the low to the high portion of its range, the amount of compression of the bellows being such that the bellows will never reach its free length and will expand a unit amount for a unit change in pressure throughout the range of the instrument, and exhibiting means operated by said bellows as it changes in length.

4. In a pressure gauge, the combination of a bellows having a given free length, a cup-shaped end wall for said bellows extending into the same, a first spring seat mounted on said end wall, a fixed member, a second spring seat adjustably mounted in said member at a position coaxial with said first spring seat, a spring received between said spring seats to compress said bellows and to keep said bellows under such compression that the bellows never reaches its free length when subject to the range of pressures for which the bellows is designed, a part attached to said first spring seat and extending axially through said second spring seat, and exhibiting means operated by said part.

5. In a pressure gauge, the combination of a bellows, a cup-shaped end wall for said bellows extending into the same, means to apply a pressure to be measured into the interior of said bellows, a spring, means to mount said spring outside of said bellows with one end bearing against said end wall with a force to compress said bellows more than it will be expanded when the maximum pressure for which the gauge is designed to measure is applied therein, and exhibiting means moved in accordance with the position of said bellows end wall.

6. In a pressure gauge, the combination of a bellows having a closed end wall and a given free length, a spring having one end bearing against said wall and having its other end bearing against an adjustable seat, means to apply a pressure in said bellows, said seat being adjusted to a position in which said spring compresses said bellows from said given free length to a second given length, said second given length being such that an increase in pressure in said bellows to the maximum for which the pressure gauge is designed will not extend said bellows to its given free length, and exhibiting means moved to a position varying with the position of said bellows and wall.

7. In a pressure gauge, the combination of means forming a chamber, said means including a bellows forming one wall of said chamber and having a given free length, means including a spring operative to compress said bellows to a second given length, the compression being of such an extent that when a vacuum is applied to said chamber to expand said bellows through the range of the instrument said bellows will not be expanded to its given free length, exhibiting means, and means operated by said bellows as it changes in length to adjust said exhibiting means.

8. In a pressure gauge, means forming a chamber, one wall of said chamber being formed of a bellows having an end wall, a fixed, annular spring seat, a tubular member projecting from said end wall through said spring seat, a second spring seat adjustably received by said member, a spring received between said spring seats and acting to separate said spring seats whereby said bellows is contracted, a link extending through said tubular member and attached thereto, and an exhibiting element moved by said link as said bellows changes in length due to a pressure change in said chamber.

9. In a pressure gauge, the combination of means forming a chamber, said means including a bellows having a given free length and an end wall forming one wall of said chamber, the bellows being arranged to extend towards the opposite wall of the chamber, a fixed support, a cup-shaped member having an opening in the end thereof attached to said support and extending into said bellows, a spring seat surrounding said opening, a tubular member attached to the bellows end wall and extending through said opening into said cup-shaped member, a second spring seat adjustably mounted on said tubular member, a spring surrounding said tubular member and extending between said spring seats to contract said bellows an amount depending upon the strength of said spring, a link attached to the interior of said tubular member adjacent said bellows end wall and extending beyond the end of said tubular member, and exhibiting means operated by said link.

10. In a pressure gauge, the combination of a bellows having a normal free length and a movable end wall, a first spring, means to locate said first spring in said bellows with one end thereof bearing against said end wall, a second spring, means to locate said second spring outside of said bellows with one end thereof bearing against said end wall in opposition to said first spring, said springs being of such length that they are under compression throughout the entire range of pressure to which said bellows is subjected, said springs being of such relative strengths that said bellows is compressed an amount beyond its normal free length that it will not be expanded to its normal free length when the interior of the bellows is subjected to the maximum pressure for which the instrument is designed, exhibiting means, and means to operate said exhibiting means from said bellows end wall.

11. In a pressure gauge, the combination of a bellows having one end fixed and one end free to move, to which the pressure to be measured is applied, a spring having a fixed end and a movable end, means to mount said spring and bellows with the fixed end of the spring outside said bellows and the movable end of said spring acting on the free end of said bellows to compress the same, said spring and bellows being of such relative strengths that said bellows is compressed to such an extent that it will not expand to its free length throughout the range of the instrument, and exhibiting means operated by said bellows as it expands in length.

12. In a pressure gauge, the combination of a support, a bellows having one end attached to said support and the other end movable, a spring acting against the movable end of said bellows, means accessible from the outside of said bellows to adjust said spring to compress said bellows to a predetermined length which is less than the total compression of said bellows, means to apply a pressure to said bellows to expand the same against the force of said spring, said bellows being so compressed by said spring that it will not expand to its normal free length from said predetermined length upon the application of pressure throughout the full range of the instrument, and exhibiting means operated by said movable end of said bellows.

13. In a pressure gauge, the combination of a chamber including a bellows having a closed end wall and a given free length, a spring seat outside of said chamber, a spring having one end bearing against said seat and having its other end acting against the end wall of said bellows, said spring acting to compress said bellows to a given length shorter than said free length, said free length being such that a change in pressure applied to said bellows throughout the range of the instrument will vary the length of said bellows between said given length and a length shorter than said free length, and exhibiting means movable to a position varying with the position of said bellows end wall.

EDWIN C. BURDICK.

REFERENCES CITED

The following references are of record in the file of this patent:

UNITED STATES PATENTS

| Number | Name | Date |
|---|---|---|
| 1,338,436 | Green | Apr. 27, 1920 |
| 1,340,399 | Ohlson | May 18, 1920 |
| 1,723,548 | Heise | Aug. 6, 1929 |
| 1,997,917 | Russel et al. | Apr. 16, 1935 |
| 2,020,560 | Mapel | Nov. 12, 1935 |
| 2,032,245 | Wotring | Feb. 25, 1936 |
| 2,247,089 | Hopkins | June 24, 1941 |
| 2,277,681 | Burdick et al. | Mar. 31, 1942 |
| 2,284,588 | Rineer | May 26, 1942 |

FOREIGN PATENTS

| Number | Country | Date |
|---|---|---|
| 284,679 | Great Britain | June 28, 1928 |
| 553,211 | Great Britain | May 12, 1943 |
| 765,592 | France | Mar. 26, 1934 |